No. 639,575. Patented Dec. 19, 1899.
C. B. HOLMES.
BICYCLE CHAIN.
(Application filed Feb. 6, 1899.)
(No Model.)
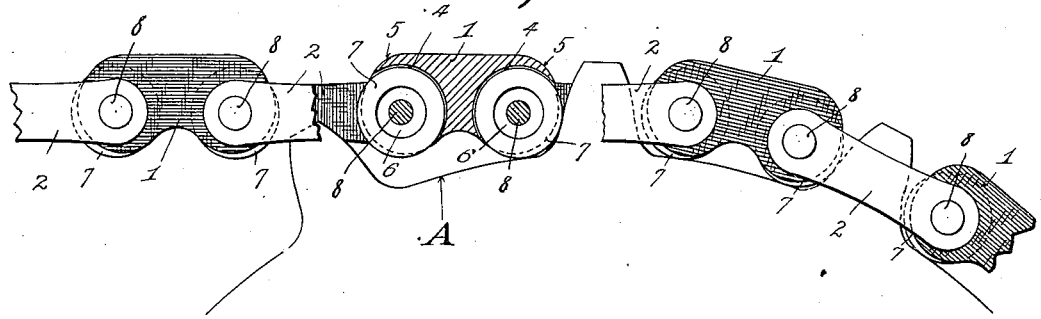
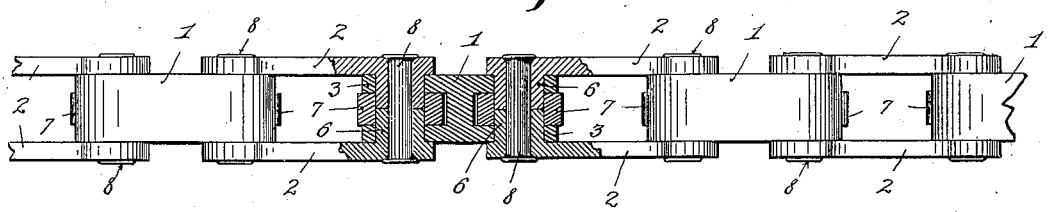
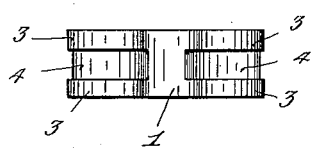
Witnesses.
Harry Kilgore,
F. D. Merchant.
Inventor.
Charles B. Holmes,
By his Attorney,
Jas. F. Williamson.
THE NORRIS PETERS CO., PHOTO-LITHO., WASHINGTON, D. C.

United States Patent Office.

CHARLES B. HOLMES, OF MINNEAPOLIS, MINNESOTA.

BICYCLE-CHAIN.

SPECIFICATION forming part of Letters Patent No. 639,575, dated December 19, 1899.

Application filed February 6, 1899. Serial No. 704,608. (No model.)

*To all whom it may concern:*

Be it known that I, CHARLES B. HOLMES, a citizen of the United States, residing at Minneapolis, in the county of Hennepin and State of Minnesota, have invented certain new and useful Improvements in Bicycle-Chains; and I do hereby declare the following to be a full, clear, and exact description of the invention, such as will enable others skilled in the art to which it appertains to make and use the same.

My present invention relates to sprocket-chains, and has for its primary object the production of an improved driving-chain for bicycles.

To this end my invention consists of the novel devices and combinations of devices hereinafter described, and defined in the claims.

The several points of my improvement will be hereinafter considered.

The preferred form of my improved driving-chain is illustrated in the accompanying drawings, wherein like characters indicate like parts throughout the several views.

Figure 1 is a view principally in side elevation, but with some parts broken away, illustrating my improved chain and showing in diagram a portion of the coöperating sprocket-wheel. Fig. 2 is a plan view of the chain with some parts broken away and some parts shown in section, and Fig. 3 is a bottom plan of one of the solid blocks or sections of the chain.

The letter A indicates in diagram a portion of the sprocket-wheel, as shown in Fig. 1. The block-links of the chain are indicated by the numeral 1, and the side links, which connect the block-links, are indicated by the numeral 2. The block-links 1 are integrally formed, being preferably milled or otherwise cut from solid steel blanks, and they are provided at their ends with laterally-spaced ears 3, between which seats 4 for the rollers, to be presently noted, are formed. These seats 4 are approximately semicylindrical, and it is important to note that the outer surface of the block projects at its ends, as shown at 5, so as to form guard-sections that nearly or quite cover the rollers. The links 2 are formed in longitudinal split sections, or, in other words, with separable sides, and these sides are provided with inwardly-projecting trunnions 6, that are pressed together to form complete trunnions that space apart the said side sections of the links. The trunnions 6 are passed inward through the coöperating ears 3 of the block-links 1 approximately on the axis of the coöperating seats 4. The antifriction-rollers (indicated at 7) are mounted on the coöperating trunnions 6 and work closely within the corresponding seats 4, with their outer and lower surfaces projecting very slightly beyond the embracing ears 3. Rivets 8 are then passed through suitable perforations in the coöperating trunnions 6 and are riveted at their outer ends to secure the sections of the chain together. Of course bolts might be substituted for these rivets; but the rivets are for obvious reasons preferred. Now it will be noted by reference particularly to Fig. 2 that the outer surfaces of the blocks 1 have complete circular engagements with the sides of the links 2 adjacent to their trunnions 6. This prevents side play in the chain. When the rivets 8 are tightly riveted, (and they should be, of course,) the coöperating trunnions are tightly drawn together in perfect alinement and are thus, in effect, rendered practically integral. The lateral spacing of the sections of the links 2 is predetermined by the lengths of the trunnions, and by specially-designed machinery these trunnions may be very quickly and accurately formed. Hence just the exact desired fit between the block-links and the side links may be easily accomplished, and the chain when connected as above described will have practically no side play or swing.

The guard-flanges 5 of the block-links 1 serve both as sand-guards to prevent sand from falling onto the antifriction-rollers 7 and to rigidly tie together the ears 3, thereby preventing spreading or bending of the same under side strains on the chain.

The parts of the block-links being integrally formed are much stronger and more durable than if separately formed and afterward connected together.

It will of course be understood that my invention above described is capable of modification as to its detail.

What I claim, and desire to secure by Letters Patent of the United States, is as follows:

1. A sprocket-chain involving side and block links, the former having trunnions pivotally working within the latter, and antifriction-rollers mounted on said trunnions and seated within said block-links, substantially as described.

2. A sprocket-chain involving side and block links, the former having inturned trunnions pivotally working within the latter, antifriction-rollers mounted on said trunnions and seated within said block-links, and rivets passed through the coöperating trunnions and rigidly connecting the coöperating links, substantially as described.

3. In a sprocket-chain, the combination with the sectional side links 2, having the trunnions 6, of the block-links 1 having the seats 4 and ears 3, the antifriction-rollers 7 mounted on said trunnions 6 within said seats 4, and means for securing the links together, substantially as described.

4. In a sprocket-chain, the combination with side links having inturned trunnions, of block-links pivoted on said trunnions, and having integrally-formed parts, and antifriction-rollers mounted on said trunnions within said block-sections, substantially as described.

5. In a sprocket-chain, the combination with the sectional side links 2, having trunnions 6, of the block-links 1, having the integrally-formed ears 3 spaced to form the seats 4, and the rivets 8 passed through the coöperating trunnion 6 and rigidly securing the coöperating links together and in pivotal connection with the block-links and the antifriction-rollers 7, mounted on said trunnions 6 and working in said seats 4, substantially as described.

6. In a sprocket-chain, the combination with the block-links 1, having the ears 3, roller-seats 4 and extended web portions 5 connecting said ears 3 and constituting roller-shields, of the intermediate side links pivotally connected to said ears 3, and the antifriction-rollers 7, mounted on the link-joints, working in said seats 4 and shielded by said web portions 5, substantially as described.

7. In a sprocket-chain, the combination with the block-links 1, of the sectional side links 2, having inturned trunnions 6 projecting into said block-links 1, the said side links having continuous circular engagement with said block-links in the vicinities of said trunnions, substantially as described.

In testimony whereof I affix my signature in presence of two witnesses.

CHARLES B. HOLMES.

Witnesses:
M. BLANCHER,
F. D. MERCHANT.